United States Patent [19]

Petty et al.

[11] Patent Number: 4,959,506
[45] Date of Patent: Sep. 25, 1990

[54] JUNCTION BOX

[75] Inventors: John Petty, Bonnet Bay; Sandy McNeil, Hunters Hill, both of Australia

[73] Assignee: Elconnex Pty. Limited, New South Wales, Australia

[21] Appl. No.: 198,817

[22] PCT Filed: Aug. 21, 1987

[86] PCT No.: PCT/AU87/00282
§ 371 Date: Apr. 11, 1988
§ 102(e) Date: Apr. 11, 1988

[87] PCT Pub. No.: WO88/01447
PCT Pub. Date: Feb. 25, 1988

[30] Foreign Application Priority Data

Aug. 21, 1986 [AU] Australia .............................. PH7588
May 18, 1987 [AU] Australia .............................. PI2014

[51] Int. Cl.$^5$ .............................................. H02G 3/14
[52] U.S. Cl. .................................. 174/65 R; 174/52.1;
220/298; 285/158; 285/401
[58] Field of Search ................................ 174/65 R, 52 R;
285/158, 401; 220/298, 301

[56] References Cited

U.S. PATENT DOCUMENTS

| | | | |
|---|---|---|---|
| 1,131,399 | 3/1915 | McGinley | 174/65 R |
| 3,728,470 | 4/1973 | Maier | 174/65 R X |
| 3,901,574 | 8/1975 | Paullus | 285/401 X |
| 4,103,101 | 7/1978 | Maier | 174/65 R |
| 4,203,686 | 5/1980 | Bowman | 220/301 X |

Primary Examiner—Leo P. Picard
Assistant Examiner—David A. Tone
Attorney, Agent, or Firm—Townsend and Townsend

[57] ABSTRACT

A junction box (1) adapted to have releasably connected fittings (12,14,15,16,17) of variable inlet diameters and connections. The fittings (12,14,15,16,17) have castellations (18) and an abutment face (21) defining an annular recess (20). The castellations (18) fit into cutouts (22) in the port (3) whereby when said fitting (12) is rotated the castellations have tightening means (38) which force against the castellations (33) of the port (3) forming a seal between sealing faces (24) of the port (3) and abutment face (21) of the fitting (12) to prevent lateral movement and whereby the projection (25) in the port (3) rides up over the ramp surface (19) to lock into the locking recess (27) to prevent rotational movement. The ramp surface being suitably shaped so as to allow for its defamation by manual means to allow for unlocking of the connector.

18 Claims, 6 Drawing Sheets

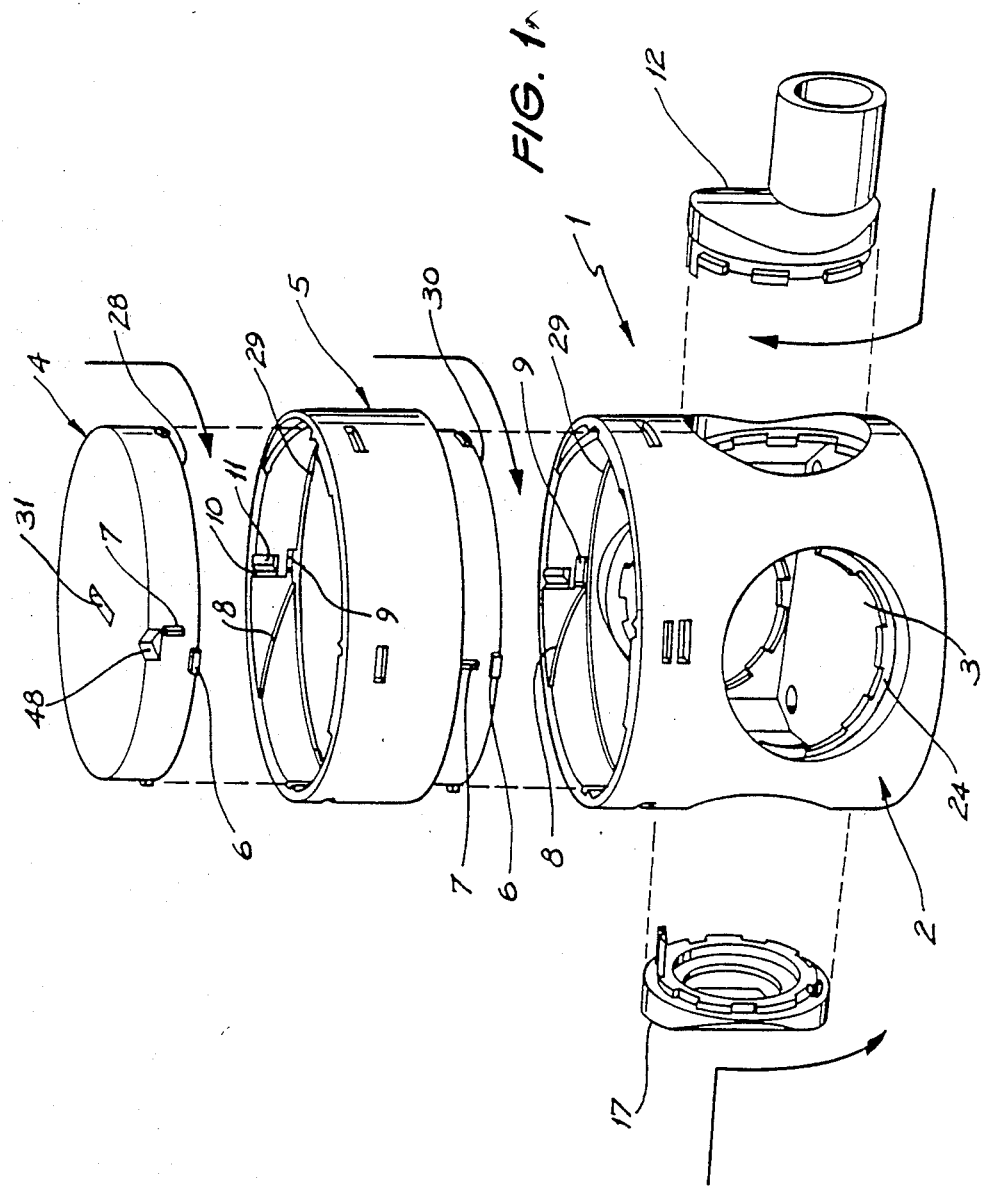

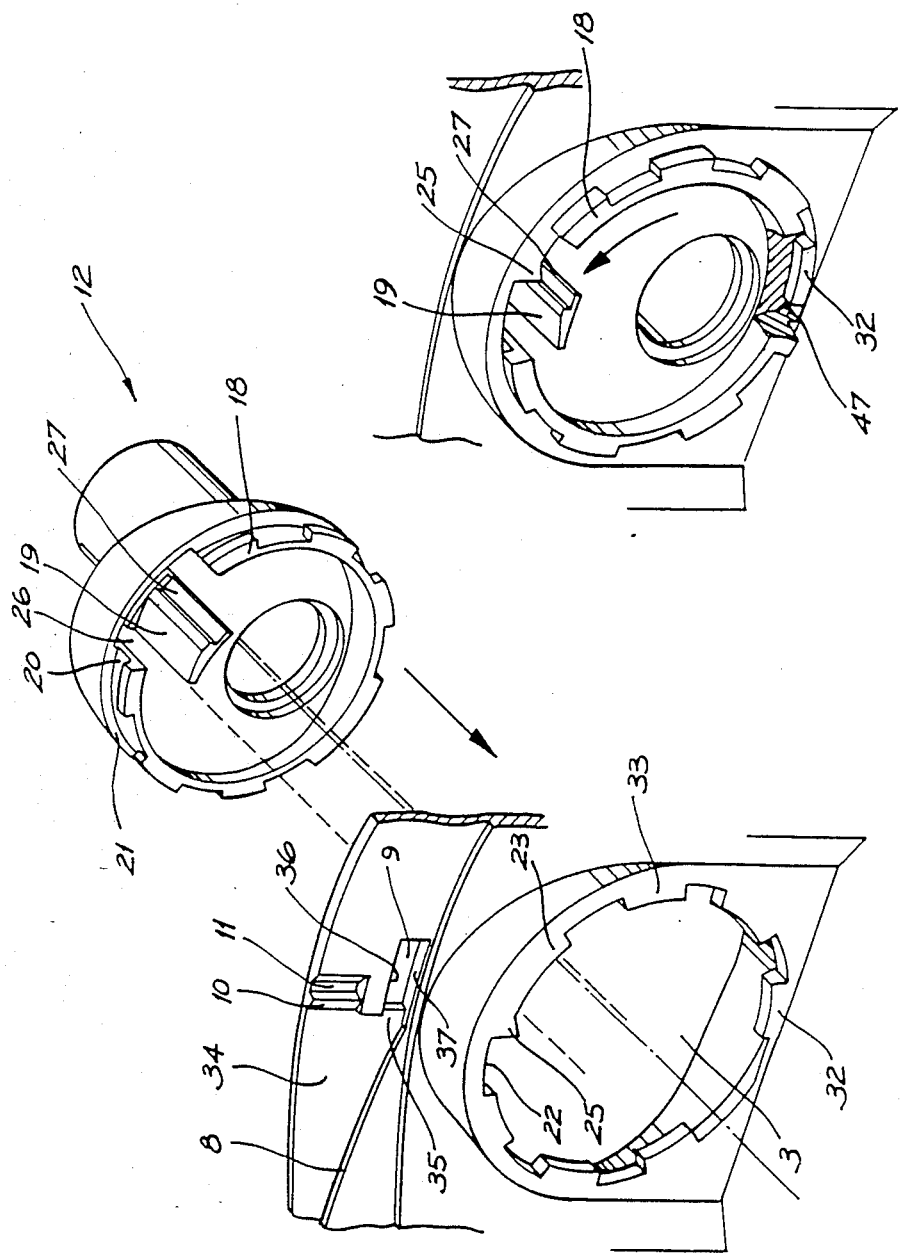

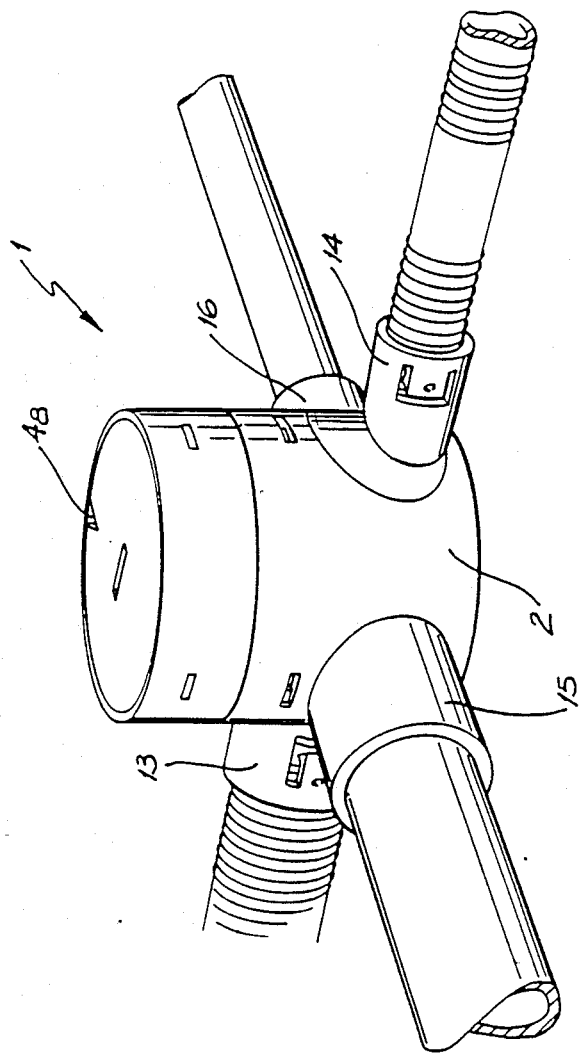

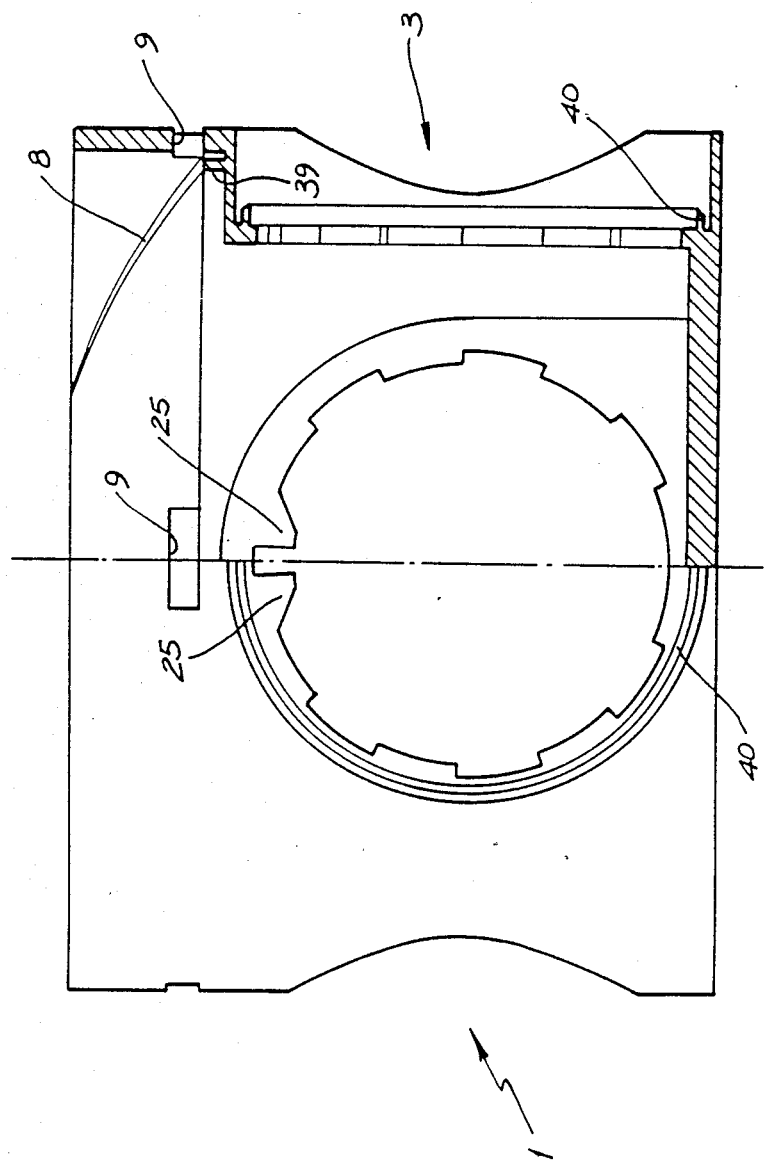

JUNCTION BOX

FIELD OF THE INVENTION

The present invention relates to a Junction Box used for connecting two or more conduit connectors for shielding wiring or the like.

BACKGROUND OF THE INVENTION

Existing methods of joining two or more lengths of conduit to a junction box involves coating the end of the conduit to be glued with adhesive and inserting the end into the spigot of the junction box. It is necessary to have respective size of spigot for the conduit. Further a junction box having the desired number of spigots for the required sizes is required. Thus a large range of junction boxes must be produced and stored to meet the needs. Further because of the requirement of gluing, the joints are permanent and the junction box is therefore non-reusable or altered to a different configuration.

Attempts have been made to overcome this problem by providing a junction box which has connectors which lock into ports in a junction box. Some systems utilized a metal junction box with threaded ports where adaptors are screwed thereto. A modification of this system is described in South African Patent No. 71/3652.

In particular, there are provided ports in a junction box having the same sized notches surrounding each port. The connector comprises a series of lugs, located at one end thereof, which are so sized and positioned as to fit through the notches of a port such that when the connector is inserted in the port and rotated, the wall surrounding the port is located between an annular shoulder and the lugs. Also located on the shoulder is a projection which snaps into a notch in the wall surrounding the port to lock the connector in place. The problem with this arrangement is that the connection is not readily released. As the wall of the port is sandwiched between the lugs and the shoulder, with the projection connected to the substantially rigid shoulder there is very little chance of distorting the material to free the projection except by considerable force or by prying the wall away from the projection by a screw driver or the like which could damage either the wall of the junction box or the connector and prevent reuse of the component.

SUMMARY OF THE INVENTION

The present invention seeks to ameliorate these problems by providing a junction box assembly comprising:

a plurality of ports of the same diameter located therearound; each port having an inwardly radially extending wall with cutouts of at least two different sizes located around the periphery thereof, and a projection extending substantially radially inwardly into said port; and at least one connector adapted to engage in any one of said ports, each connector having: a set of castellations at or adjacent one end, and being of a size complementary to the cutouts in said ports;

an annular recess located between an abutment surface and said castellations;

resilient ramp means with a locking recess; and tightening means located on said castellations facing said abutment surface whereby to connect said connector to a port, the castellations are aligned with, and pushed through their respective cutouts and the connector rotated such that the said projection rides up said ramp means and engages in said locking recess, with the said annular wall being held in said annular recess and being urged into abutment with said abutment surface by said tightening means so that the connector is releasably locked against rotational and lateral movement in said port and whereby to release the connector the ramp is deflected so as to free the said projection from said locking recess to allow for rotation and then withdrawal of the connector.

In a further form the invention comprises a junction box having a circular opening;

an annular wall extending from said opening to an inwardly projecting shoulder at least one recess located in said annular wall adjacent the inwardly projecting shoulder and;

an inwardly extending projection having a ramped surface and a locking recess located adjacent the projection;

a circular lid having a cylindrical outer wall with a first series of projections located therein, a locking projection, and a recess in the lid adjacent said locking projection whereby when said lid is placed in said opening and rotated the first series of projections enter into the respective recesses holding the lid against axial movement while the locking projection rides up and over the ramped surface and locks into said locking recess locking the lid against rotational movement and whereby to remove the lid a tool is placed in the recess in the lid and the wall of the opening is deflected to allow the locking projection to disengage from the locking recess to allow removal of the lid.

Preferably the junction box has four ports into which any of the conduit connectors can be releasably attached in a relatively watertight manner.

BRIEF DESCRIPTION OF THE DRAWING

The invention will now be described with reference to the accompanying drawing in which:

FIG. 1 illustrates an exploded view of one embodiment of the present invention;

FIG. 2 is a cut away view showing the insertion of one form of connector into a port in a junction box according to the embodiment of FIG. 1;

FIG. 3 illustrates the locking of the connector of FIG. 2 into the port;

FIG. 4 illustrates the junction box of the previous drawings showing various forms of connections;

FIG. 5 illustrates a half section through another embodiment of the junction box of the present invention;

DESCRIPTION OF THE PREFERRED EMBODIMENTS

Figure 6:
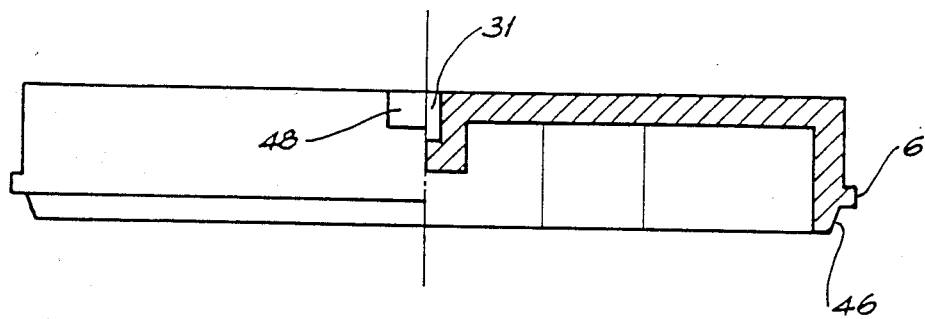
FIG. 6 illustrates a lid for the junction box shown in FIG. 5.

As shown in the accompanying drawings a junction box 1, according to one embodiment of the present invention, comprises a cylindrical body 2 having four ports 3 located equidistantly therein. The junction box 1 is open topped and has a lid 4, which closes the box 1 in a relative watertight manner. As shown in FIGS. 1 and 4 extension members 5 can be fitted to the body 2 to increase the height of the junction box if required.

The extension member 5 have four horizontally extending lugs 6 with one vertically extending lug 7 located above one of the lugs 6.

The lid 4 had four horizontal extending lugs 6 with one vertically extending lug 7 similar to those shown as 6 and 7 on the extension member 5. The respective lugs of the lid are located on the outer wall of the lid below the recess 48.

To close the lid 4 to the extension member 5 or the extension member 5 to the body 2 the respective part is simply twisted into place where it locks. The respective seal is formed by the annular base 28 of the lid seating on the annular sealing surface 29 of the extension member 5 or the cylindrical body 2.

The position of horizontal lugs 6 and the height of the recess 9 are such that in engagement therebetween, an axial sealing force urges the respective sealing surfaces into a relatively liquid tight engagement.

To ensure a liquid tight seal a resilient or flexible seal element could be located by a suitable means, such as by printing, on either or both of the respefctive sealing surfaces. A description of one form of seal will be described later. To allow for tolerances in construction, the cut-out 9 could have another cut-out located above forming a finger therebetween which would act as a spring, bearing on the lug 6 located in the cut-out 9.

The horizontal lug 6 slides down the ramp 8 where it locks into the cut-out 9 (see FIGS. 1 and 2) to lock the lid 4 or the extension member 5 against vertical movement relative to the junction box body 2. As the horizontally extending lug 6 engages into the cut-out 9, the vertically extending lug 7 rides over the ramped shoulder 10, to lock into the recess 11, to restrain the lid 4 or extension member 5 against rotational movement relative to the body 2. The cut-out 9 could be replaced by a recess located in the inner surface of the respective wall of the extension member 5 or the cylindrical body 2.

Both the cut-outs or recesses and the lugs 6 could be located at any circumferential position relative to the lug 7 and ramped shoulder 10.

As is shown in FIG. 2 the ramp 8 is formed by thinning the wall 34 which also provides the entrance 35 to the cut out 9, which is located in the thicker wall section, and has an overhanging shoulder 36 and bottom ledge 37 which prevents axial movement of horizontally extending lugs 6.

With the lid 4 or the extension member 5 restrained against rotational and axial displacement relative to the body 2, a seal therebetween is produced. To release the lid, a screw driver or the like is inserted in the recess 48. By twisting the screw driver, the wall of the extension member 5 or the cylindrical body 2 is elastically deformed to allow the vertically extending lug 7 to disengage from the recess 11 and pass back over the ramped shoulder 10 and simultaneously disengage the lugs 6 from the recesses 9.

After disengaging the lug 7 from the shoulder 10, to remove the lid 4, a screw driver is inserted into the recess 31 on the lid 4 and twisted to rotate the lid 4, whereby the horizontal lugs 6 climb up the ramps 8 to raise the lid 4 clear of the cylindrical body 2 or the extension member 5. The outer edge of the lid 4 could be corrugated such that by rotating a screw driver or a phillips head screw driver in the recess 48 and rotating the same the lid is disengaged and repeated screwdriver forces the lid up to the ramps 8. However, the extension member 5 for all intents and purposes is locked to the junction box 1.

The ramps are preferred for ease of removal of the lid, however the ramps could be omitted.

As shown in FIG. 4, the conduit connectors 12 can be of any required type. A large 13 or small 14 diameter corrugated conduit connector can be used having the means for engaging the corrugated conduits as described in International Patent application No. PCT/AU87/00031. Rigid conduit connectors of large 15 or small 16 diameters can be used, with the conduits bonded into the connectors. A blank 17 as shown in FIG. 1. can be used to seal any port 3 not required. The contour of the blank 17 is such to conform to the outer surface of the junction box body 2.

The connection between the conduit connectors 12 will now be described with reference to FIGS. 2 and 3 wherein one form of connector is shown. However the operation of the locking mechanism is the same, whether a blank or different diameter or form of connector is being connected to the port.

As shown in FIG. 2 the conduit connectors 12 contain a set of castellations 18 of two different sizes located around the periphery of one end, together with a wedge shaped projection 19. Located behind the castellations 18 is an annular recess 20 separating the castellations 18 from the sealing face 21.

The port 3 had cutouts 22 on its rim 23 complementary to the castellations 18 such that the conduit connector 12 can be pushed into the port 3 as shown in FIG. 2.

Figure 7:
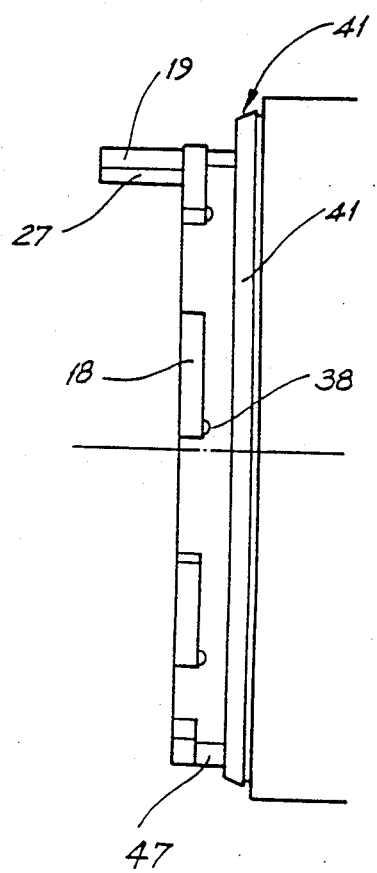
FIG. 7 illustrates a side view of the connection end of one embodiment of a conduit connector.

The castellations 18 are tapered on their recess face as shown in FIG. 2 or have projections, i.e. raised nipples, located on the inner surface of the castellations as shown in FIG. 7 such that when the conduit connector 12 is rotated in the direction of the arrow as shown in FIG. 3. with the rim 23 of the port 3 engaged in the annular recess 20, the tapered castellations or projections exert a wedging action, forcing the sealing face 21 of the connector into engagement in a relatively watertight manner with the sealing face 24 of the port 3. To ensure a liquid tight seal a resilient or flexible seal element could be located, by any suitable means such as printing, on either of the sealing faces 21 or 24. A description of one form of seal will be described later.

With the utilization of the projections on the inner faces of the castellations 18, only the projections engage on the back face of the castellations 33 of the ports 3 in the junction box, rather than a full face engagement between the faces of the respective castellations.

The utilization of the projections allow for greater tolerances of manufacture and allows for "fine tuning" in providing the desirable sealing force between the castellations 18 of the connections 12 and the castellations 33 of the port 3 in production.

Further with the projections in the form of raised nipples located rearwardly (in the direction of rotation) on the inner faces of the castellations 18, the castellation are distorted in a wave like fashion around their annulus, providing a spring, urging engagement between the connection 12 and the port 3.

When the conduit connector 12 is inserted in the port 3 the projection 25 of the port rim 23 fits into the recess 26 of the conduit connector 12. When the conduit connector 12 is rotated as shown in FIG. 3, the projection 25 rides up the wedge shaped projection 19 and locks in the locking recess 27. As shown in FIG. 3. in the cut-out, and FIG. 7, a stop 47 is located on the conduit connector 12, diametrically opposite the wedge shape projection 19. This stop 47, in the fully locked position, abuts against the castellation 32 to prevent overtightening of the connector 12. Therefore the conduit connectors 12 are locked into the port and are restrained against rotational and axial movement relative to the port.

To release the connector 12 from the port 3, the wedge shaped projection 19 is depressed, to allow the projection 25 to pass out of the locking recess 27, as the connector is rotated in the opposite direction to that shown by the arrow in FIG. 3. Whereby the castellations 18 of the connection 12 align with the cut-outs 22 of the port 3 and the connector 12 is removed from the port 3.

To ensure liquid tightness of the fitting of the lid to the junction box and the fitting of the connectors to the junction box, annular resilient seals 39 and 40 can be located as shown in FIG. 5.

Figure 8:
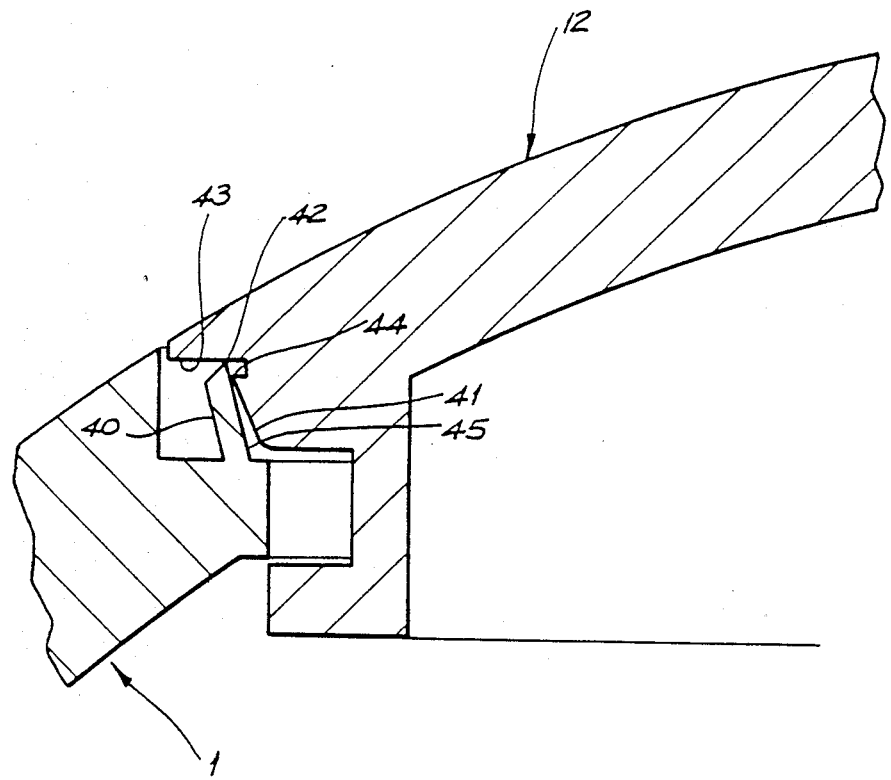
FIG. 8 shows a sectional detailed view of the engagement of a connector as shown in FIG. 7 and the junction box as shown in FIG. 5.

The connector 12 as shown in FIG. 7 has a tapered sealing annular member 41. Therefore when the connector 12 is twisted into its locking position the nipples 38 force the sealing member 41 into engagement with annular seal 40 as shown in FIG. 8. The annular seal 40 is deformed outwardly by the wedging action of the tapered annular sealing member 41 to provide a two position seal.

The edge 42 of annular seal 40 (see FIG. 8) abuts against the annular lip 43 of the connector 12 to form an edge seal while the edge 44 of the tapered sealing annular member 41 forms an edge seal against the face 45 of the seal 40. Depending upon the angle of the taper and the respective dimensions of the seal 40 and annular member 41, a face seal could occur therebetween.

The seal depending upon the requirements could be a single position either face or lip or any combination thereof.

Turning to the embodiment of the lid 4 shown in FIG. 6, a tapered annular sealing face 46 is provided. Thus when the lid 4 is being locked into the junction box as illustrated in FIG. 5, the tapered annular sealing face 46 bears on the inside of the annular seal 39 deforming it outwardly to form a face or edge seal therewith (depending on the respective dimensions of the parts) when the lid is locked to the junction box 1.

In other embodiments of the present invention, not illustrated, the conduit connectors would have castellations similar to those of the embodiment illustrated, but the locking means instead of being the projection 25, is a ramped shoulder similar to that designed as 10 on the periphery of the housing 2 in FIG. 2, with the locking member on the connector 12 being a complementary projection.

Thus any suitable locking means can be utilized to lock the connector against rotational motion when the conduit connector is inserted into the port and rotated to its locking position. Similarly any suitable locking means can be used for the lid or the extension member.

As is shown in FIGS. 1. and 4, the outer surface of the conduit connector 12, 14 is so shaped as to conform to the contour of the outer surface of the junction box when assembled in the locked position.

In a further embodiment the lid 4 could be replaced by a switch, power point or light fitting, having locking and releasing means on its circumference similar to those of the lid 4.

Therefore the present invention provides a junction box of any required shape, having a plurality of entry ports located therein, with conduit connectors adapted to mate within one of the ports such that a watertight seal is formed therebetween.

It should be obvious to people skilled in the art that modifications and alterations can be made to the junction box described above without departing from the spirit or scope of the present invention.

The connectors rather than extending radially from the junction box could in fact extend at an angle 60° or any required angle such that the combination of two ports provides a split parallel entry with one port receiving electric and the other adjacent port receiving data information either by way of electrical or optical fibres or the like.

We claim:

1. A junction box comprising a body, a plurality of ports of the same diameter formed in the body located around the body; each port having an inwardly radially extending wall with cutouts of at least two different sizes located around the periphery thereof, and a projection extending substantially radially inwardly into said port; and
   at least one connector adapted to engage in any one of said ports, each connector having: a set of castellations at or adjacent one end, and being of a size complementary to the cutouts in said ports;
   an annular recess located between an abutment surface and said castellation:
   resilient ramp means with a locking recess at said one end of the connectors; and
   tightening means located on said castellations facing said abutment surface whereby to connect said connector to a port, the castellations are aligned with, and pushed through their respective cutouts and the connector rotated such that the said projection rides up said ramp means and engages in said locking recess, with the said annular wall being held in said annular recess and being urged into abutment with said abutment surface by said tightening means so that the connector is releasably locked against rotational and lateral movement in said port and whereby to release the connector the ramp is deflecting so as to free the said projection from said locking recess to allow for rotation and then withdrawal of the connector.

2. A junction box according to claim 1 wherein said resilient ramp means comprises an axially extending resilient finger having located on its outer surface a ramp terminating in the locking recess.

3. A junction box according to claim 1 wherein said resilient ramp means comprises an axially extending resilient finger having a ramped outer surface, and said annular recess contains therein a stop which, in the locked position of the port and connector, limits movement of the connector in the locking direction by abutting against a wall of one of said cutouts.

4. A junction box according to claim 1 wherein said tightening means comprises a projection.

5. A junction box according to claim 1 wherein said tightening means comprises the castellations having a tapered thickness.

6. A junction box according to claim 1 wherein there is provided sealing means located on said abutment surface.

7. A junction box according to claim 6 wherein the sealing means comprises an annular resiliently deformable skirt.

8. A junction box according to claim 7 wherein said connector comprises a ring having a tapered outer surface which abuts against and deforms said annular resiliently deformable skirt, to provide a substantially water tight seal therewith.

9. A junction box according to claim 1 further comprising sealing means located around said port.

10. A junction box according to claim 1 wherein said body has a cylindrical outer surface and wherein the connector has an outer surface which conforms to the cylindrical outer surface of the body.

11. A junction box having a circular opening;
an annular wall extending from said opening to an inwardly projecting shoulder;
at least one recess located in said annular wall adjacent the inwardly projecting shoulder and;
a inwardly extending projection having a ramped surface and a locking recess located adjacent the projection;
a circular lid having a cylindrical outer wall with a first series of projections located thereon, a locking projection, and a recess in the lid adjacent said locking projection whereby when said lid is placed in said opening and rotated the first series of projections enter into the respective recesses holding the lid against axial movement while the locking projection rides up and over the ramped surface and locks into said locking recess locking the lid against rotational movement and whereby to remove the lid a tool is placed in the recess in the lid and the wall of the opening is deflected to allow the locking projection to disengage from the locking recess to allow removal of the lid.

12. A junction box according to claim 11 wherein there is provided ramp means located on said annular wall extending from said opening to said shoulder with one of the said at least one recesses located adjacent the bottom of said ramp means, or wherein when said lid is placed in the opening and rotated the first series of projections slide down the ramp means.

13. A junction box according to claim 12 wherein said ramp means is formed by a thinning of the annular wall which also forms an entrance to said at least one recess.

14. A junction box according to claim 13 wherein said locking recess is an axially extending recess.

15. A junction box according to claim 11 wherein said inwardly projecting shoulder has sealing means located thereon.

16. A junction box according to claim 15 wherein said sealing means is a resiliently deformable skirt.

17. A junction box according to claim 11 wherein said cylindrical outer wall terminates in a sealing means.

18. A junction box according to claim 17 wherein said cylindrical wall has a frustoconical surface which abuts with and deforms the resiliently deformable skirt to form a substantially water tight seal therewith.

* * * * *